United States Patent
Barabas et al.

[11] 3,910,862
[45] Oct. 7, 1975

[54] COPOLYMERS OF VINYL PYRROLIDONE CONTAINING QUARTERNARY AMMONIUM GROUPS

[75] Inventors: Eugene S. Barabas, Watchung; Marvin M. Fein, Westfield, both of N.J.

[73] Assignee: GAF Corporation, New York, N.Y.

[22] Filed: Aug. 27, 1973

[21] Appl. No.: 392,271

Related U.S. Application Data

[63] Continuation-in-part of Ser. No. 7,250, Jan. 30, 1970, abandoned, and a continuation-in-part of Ser. No. 138,328, April 28, 1971, abandoned.

[52] U.S. Cl. ...260/79.3 MU; 260/80.3 N; 260/80.3 E; 260/80.72; 260/86.1 N; 424/71
[51] Int. Cl.² ............... C08F 15/00; C08F 15/02
[58] Field of Search . 260/79.3 MU, 89.7 N, 86.1 N, 260/80.72, 88.3 L, 80.3 N, 80.3 E; 424/70

[56] References Cited
UNITED STATES PATENTS

| | | | |
|---|---|---|---|
| 2,808,349 | 10/1957 | Melamed | 117/139.5 |
| 2,810,713 | 10/1957 | Melamed | 260/80.3 |
| 2,980,634 | 4/1961 | Melamed | 260/2.1 |
| 3,144,391 | 8/1964 | Goff | 167/87.1 |
| 3,385,839 | 5/1968 | Honig | 260/80.73 |
| 3,417,054 | 12/1968 | Merijan | 260/66 |
| 3,428,617 | 2/1969 | Sobolev | 260/89.5 |

*Primary Examiner*—Christopher A. Henderson, Jr.
*Attorney, Agent, or Firm*—Walter C. Kehm; James N. Blauvelt

[57] ABSTRACT

A high molecular weight, film-forming quaternary ammonium polymer is provided represented by the following formula:

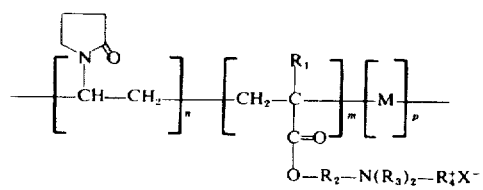

wherein $n$ ranges from about 20 to about 95 mole %, $m$ ranges from about 5 to about 80 mole % and $p$ ranges from 0 to about 50 mole %, and $n + m + p = 100$; $R_1$ is H or $CH_3$; $R_2$ is alkylene or containing from 2 to about 20 carbon atoms; each $R_3$ is a lower alkyl radical which can be the same or different; $R_4$ is alkyl or aralkyl of from 1 to 8 carbon atoms; X is a member selected from the group consisting of halogen, $SO_4$, $HSO_4$ and $R_4SO_4$ radicals; and M is the residuum of a copolymerizable vinyl monomer.

Methods for forming such polymers are also provided comprising heating a solution comprising vinyl pyrrolidone and a dilower alkylaminoalkyl acrylate or methacrylate in a solvent therefor in the presence of a free radical initiator at temperatures ranging from about 50°C. to about 100°C. for a sufficient period of time to substantially effect copolymerization, and thereafter admixing the copolymer with a quaternizing agent to quaternize the resulting copolymer.

5 Claims, No Drawings

COPOLYMERS OF VINYL PYRROLIDONE CONTAINING QUARTERNARY AMMONIUM GROUPS

This application is a continuation-in-part of copending application Ser. Nos. 7,250, filed Jan. 30, 1970, now abandoned and 138,328, filed Apr. 28, 1971 now abandoned.

The present invention is directed to certain novel synthetic polymers useful for aerosol hair sprays, hair conditioners, and hair setting lotions, etc. and to methods for the preparation thereof; more particularly, the present invention is directed to certain high molecular weight, film-forming synthetic polymers comprising quaternary copolymers of vinyl pyrrolidone and a further copolymerizable vinyl monomer, such synthetic polymers providing greater adhesion, greater holding power, and less flaking than conventional synthetic polymers used in hair preparations. Also, the present invention provides methods for the preparation of such polymers.

A number of synthetic polymers are presently used in hair sprays, hair wave set lotions, hair conditioners, etc., the function of such synthetic polymers being generally to contribute "body" and holding power to the hair-do sets. The holding phenomena of hair sprays and setting lotions are, however, not very well defined. In hair sprays, a polymer globule holds several keratin fibers together so as to produce the necessary holding of the hair in place. In setting and conditioning lotions, however, polymer films are deposited over the surface of the hair and several hair strands are adhered together. In these various applications, adhesion of the polymer to the hair is a very important factor which influences the usefulness of a particular synthetic polymer or resin in a hair preparation. Many of the synthetic polymers or resins heretofore employed exhibit poor adhesion to hair causing poor holding of the hair in place and excessive flaking from the hair when the hair is combed or brushed.

At the present time the principle synthetic polymers or resins employed in hair sprays, wave set lotions, and hair conditioners include polyvinyl pyrrolidone homopolymers and copolymers, half esters of polyvinyl ethers - maleic anhydride, polyvinyl acetate - crotonic acid co- and terpolymers, half esters of ethylene - maleic anhydride as well as various others. With the exception of vinyl pyrrolidone homopolymers, all of the above conventionally employed synthetic polymers and resins used in hair sprays, wave set lotions, and hair conditioners give stiff hair-dos, causing an unnatural look and imparting a false texture making the hair feel like steel-wool. In addition, such synthetic polymers or resins often result in excessive flaking or excessive "fly-away". Hair so treated soon loses its treatment ingredients and reverts to its original wildness.

Although polyvinyl pyrrolidone (PVP) homopolymers provide a more natural look, free from some of the disadvantages of other commercially available products, the use of PVP homopolymer does not provide satisfactory holding of the hair at high humidity levels. Accordingly, this is one disadvantage of the use of polyvinyl pyrrolidone homopolymers in hair spray, wave set lotions and hair conditioner compositions which has created the desire and necessity for the development of further synthetic polymers and resins free from all of the above recited disadvantages. This has now been accomplished in accordance with the present invention.

Thus, briefly stated, it has been discovered in accordance with the present invention that the above disadvantages and inherent deficiencies of previously employed hair spray resins have been eliminated by the development of a new type of polymer or resin useful in hair setting compositions including aerosol hair sprays, hair conditioners and hair setting lotions. Thus, it has been discovered in accordance with the present invention that certain quaternary derivatives of N-vinyl pyrrolidone copolymers are particularly useful in hair setting compositions in that such polymers provide excellent holding power and contribute to excellent body without possessing the disadvantages of flaking and stiffening associated with previously employed polymer materials. Moreover, the high molecular weight copolymers of the present invention afford greater curl retention than has heretofore been obtainable.

Accordingly, it is a principle object of the present invention to provide high molecular weight, film-forming polymers which are free from the inherent deficiencies and disadvantages of previously employed polymers particularly when employed in compositions applied to the hair.

It is a further object of the present invention to provide such polymers which when employed in hair spray compositions provide high curl retention and contribute to the body and holding of the hair-do without flaking and stiffness.

It is still a further object of the present invention to provide high molecular weight, film-forming polymers comprising a quaternized copolymer of N-vinyl pyrrolidone and a di-lower alkyl aminoalkyl acrylate or methacrylate and optionally a further copolymerizable vinyl monomer.

It is a still further object of the present invention to provide methods for preparing such high molecular weight, film-forming polymers.

Still further objects and advantages of the novel polymers of the present invention will become more apparent from the following more detailed description thereof.

As indicated above, the advantages of the present invention are achieved with a quaternary derivative of a copolymer of N-vinyl pyrrolidone. Such quaternary resins impart improved substantivity to hair. By this it is meant that such polymeric materials are adsorbed onto the keratin surface, thus, improving hair strength and increasing hair weight. Furthermore, such absorption of the quaternary resins is more uniform and more continuous than that which had been obtained with previously available hair setting resins. Accordingly, this provides an advantage associated with the particular materials of the present invention.

In addition, the polymers of the present invention are soluble in both water and alcohol and can be prepared in various molecular weights depending upon the reactants, catalysts, solvents and conditions employed. The high molecular weight quaternary polymers act as their own thickeners in aqueous or alcoholic solutions, with the aqueous or alcoholic solutions of the quaternary polymers displaying a slippery feel and an ease of application to the hair. When applied to the hair from solution, it is adsorbed or deposited upon the epi-cuticle as a substantially continuous thin film of great flexibility after drying. This film appears to have excellent wet memory, i.e., returning to the form it had during the drying. Because of this feature, it provides excellent curl retention after combing. In addition, hair sprayed or otherwise wet-treated with a hair setting composition containing these high molecular weight quaternary resins is easy to comb and easy to roll on rollers. Setting and conditioning lotions prepared from this resin give a firm yet soft curl which when dry allows easy combing without comb drag, but with a positive snap return of the curl to shape after the combing stress is removed.

The above advantages are associated with the use of a high molecular weight, film-forming quaternary ammonium polymer represented by the formula:

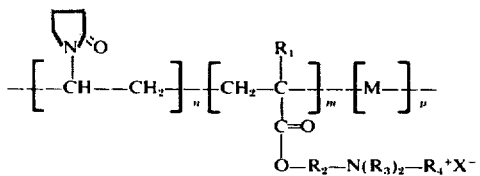

wherein $n$ ranges from about 20 to about 95 mole %, $m$ ranges from about 5 to about 80 mole % and $p$ ranges from 0 to about 50 mole %, and $n + m + p = 100$; $R_1$ is H or $CH_3$; $R_2$ is alkylene containing from 2 to about 20 carbon atoms; each $R_3$ is a lower alkyl radical containing from 1 to 4 carbon atoms and can be the same or different; $R_4$ is alkyl of from 1 to 8 carbon atoms or aralkyl of 7 or 8 carbon atoms; X is a member selected from the group consisting of halogen, $R_4SO_4$ and $HSO_4$ radicals; and M is the residuum of a copolymerizable vinyl monomer.

As indicated from the above formula, such quaternary ammonium copolymers can be prepared either by the copolymerization of N-vinyl pyrrolidone with a di-lower alkylamino alkyl-acrylate or methacrylate and quaternizing the copolymer or by the copolymerization of N-vinyl pyrrolidone with a pre-quaternized di-lower alkylamino alkyl-acrylate or methacrylate. Optionally, a further copolymerizable vinyl monomer can be included in the polymerization. The monomers are copolymerized in accordance with the present invention so that based upon 100 mole %, the vinyl pyrrolidone units are present in an amount of 20–95%, the units derived from the di-lower alkyl-amino alkyl-acrylate or methacrylate constitute from 5 to 80%, and the units derived from the further copolymerizable vinyl monomer constitute from 0 to 50%.

Exemplary di-lower alkylamino alkyl-acrylate or methacrylates suitably employed in the production of the quaternary copolymers of the present invention include such materials as:

dimethylaminomethyl acrylate
methylethylaminomethyl acrylate
dimethylaminomethyl methacrylate
diethylaminoethyl acrylate
diethylaminoethyl methacrylate
dimethylaminoethyl acrylate
dimethylaminoethyl methacrylate
methylethylaminoethyl methacrylate
dimethylaminobutyl acrylate
dimethylaminobutyl methacrylate
dimethylaminoamyl methacrylate
diethylaminoamyl methacrylate
dimethylaminohexyl acrylate
diethylaminohexyl methacrylate
dimethylaminooctyl acrylate
dimethylaminooctyl methacrylate
diethylaminooctyl acrylate
diethylaminooctyl methacrylate
dimethylaminodecyl methacrylate
dimethylaminododecyl methacrylate
diethylaminolauryl acrylate
diethylaminolauryl methacrylate
diethylaminostearyl acrylate
dimethylaminostearyl methacrylate
diethylaminostearyl acrylate
diethylaminostearyl methacrylate
di-t-butylaminoethyl methacrylate
di-t-butylaminoethyl acrylate The optional vinyl monomer represented by M in the above structural formula can comprise any vinyl monomer which is copolymerizable with N-vinyl pyrrolidone. Thus, for example, suitable vinyl monomers include the alkyl vinyl ethers, e.g., methyl vinyl ether, ethyl vinyl ether, octyl vinyl ether, etc.; acrylic and methacrylic acid and esters thereof, e.g., methyl acrylate, methyl methacrylate, etc.; vinyl aromatic monomers, e.g., styrene, α-methyl styrene, etc.; vinyl acetate; vinylidene chloride; acrylonitrile and substituted derivatives thereof; methacrylonitrile and substituted derivatives thereof; acrylamide and methacrylamide and N-substituted derivatives thereof; vinyl chloride, crotonic acid and esters thereof; etc.

Accordingly, the novel quaternized copolymers of the present invention can be characterized as having a repeating structural unit derived from A. 20 – 95 mole % of vinyl pyrrolidone;
B. 5 – 80 mole % of a di-lower alkylamino alkyl acrylate or methacrylate and
C. 0 – 50 mole % of a vinyl monomer copolymerizable with vinyl pyrrolidone.

The copolymers of the present invention are conveniently prepared by subjecting a solution of vinyl pyrrolidone and the amino acrylate or amino methacrylate monomer with or without an optional copolymerizable vinyl monomer to conditions conducive to vinyl polymerization through the double bond. Thus, for example, polymerization can be suitably initiated by the action of free radicals, the polymerization proceeding exothermically once initiated. Suitable free radical initiators conveniently employed and suitably utilized in accordance with the production of the copolymers of the present invention include organic and inorganic peroxides, e.g., hydrogen peroxide, di-tert-butyl peroxide, tert-butyl peroxypivalate, etc., aliphatic azo compounds, e.g., azobisisobutyronitrile as well as other free radical initiators well known in the polymerization art.

The copolymerization reaction of the present invention takes place in solution. Accordingly, any polar solvent for the monomers can be suitably employed which does not interfere with polymerization by chain transfer. Typical solvents which can be employed especially for hair spray, hair conditioners and the like applications, are the lower alcohols or water.

The polymerization is preferably carried out in solution at temperatures varying from about 50°C. to about 100°C. or more; however, to avoid run away conditions and to obtain a copolymer of a desirable high molecular weight it is preferred to carry out the copolymerization at the lower end of the temperature range, e.g., around about 75°C. The copolymerization reaction is preferably carried out in the absence of free oxygen, conveniently under a blanket of an inert gas, such as, nitrogen, argon or the like, or at atmospheric pressure.

As indicated previously, the polymers of the present invention are employed in the form of their quaternary salts. Accordingly, after completion of the polymerization reaction, the polymer is submitted to a treatment conducive to quaternization of the tertiary amino group, utilizing a quaternizing agent. Thus, suitable quaternizing agents which can be employed in accordance with the present invention include, for example, dialkyl sulfates, e.g., dimethyl sulfate, diethyl sulfate, etc.; alkyl sulfonic acids, e.g., methyl sulfonic acid, ethyl sulfonic acid, etc.; benzyl halides, e.g., benzyl chloride, benzyl bromide, benzyl iodide, etc.; alkyl halides, etc. Accordingly, any quaternizing agent can be advantageously employed in the production of the quaternary N-vinyl pyrrolidone copolymers of the present invention.

If desired, the copolymers of the present invention can be prepared by copolymerizing vinyl pyrrolidone with preformed quaternized monomers such as, for example, the dimethyl sulfate quaternized dimethylaminoethyl methacrylate and the like.

As indicated in the above general formula, the monomeric components are polymerized such that on a molar basis, the polymer contains 20–95 mole percent of vinyl pyrrolidone and preferably, 40–90 mole percent thereof, 5–80 mole percent of the di-lower alkyl aminoalkyl acrylate or methacrylate monomer and preferably, 5–40 mole percent thereof, and 0–50 mole percent of a further copolymerizable vinyl monomer capable of being copolymerized with vinyl pyrrolidone.

As indicated previously, the novel copolymers of the present invention are obtained via the above-described solution polymerization techniques as high molecular weight, film-forming materials. In this regard, the copolymers produced in accordance with the present invention are generally those having a Finkentscher K value within the range of 19 to 150 and more particularly within the range of 50 to 150 which corresponds approximately to a molecular weight within the range of 15,000 to 1,000,000 more particularly, within the range of 100,000 to 1,000,000. Such copolymers in the form of their quaternary salts are eminently useful as hair spray resins in that they form clear, flexible and easily removable films from both aqueous and alcoholic solutions.

The molecular weight of the copolymers of the present invention can be varied depending upon the particular choice of reactants, initiator, solvent and polymerization conditions, especially temperature, with the lower temperature being conducive to the formation of high molecular weight polymers.

In the preparation of the novel copolymers of the present invention, it is only necessary to mix the monomers in the ratios set forth above in order to provide a copolymer product produced through vinyl polymerization initiated by the action of free radicals. Generally, the copolymer is produced in a period of a few hours, generally, within about 10 hours. The following examples further illustrate the copolymers of the present invention and their preparation. Unless otherwise specified, all percentages and parts are by weight.

EXAMPLE 1

A copolymer in accordance with the present invention was produced utilizing polymerization apparatus comprising a 5 liter kettle equipped with mechanical stirrer, reflux condenser, thermometer, and gas inlet tube. 1,225 parts of ethanol as a solvent were charged into the kettle and 800 parts of vinyl pyrrolidone and 200 parts of dimethylaminoethyl methacrylate were added and agitation was started. To the system was added one part of azobisisobutyronitrile and the system was purged thoroughly with nitrogen. The temperature of the system was raised to gentle reflux at about 85°C.

The polymerization reaction was promoted with further additions of catalysts (one part each) until the amount of residual monomer was below 0.6%. The system was thereafter cooled to 25°C. and the speed of the agitation was increased.

In order to obtain the quaternary derivative of the copolymer, 98.3 parts of diethyl sulfate were added from a dropping funnel over a period of thirty minutes. When the slightly exothermic quaternization reaction was completed, the mixture was agitated for an additional period of 30 minutes. An analysis of the product produced indicated that the same contained 49.19% solids with the residual monomer content being 0.57%. The K value of the copolymer was 74.8, the same having a relative viscosity as measured as a 1% solution in ethanol of 2.837, and an intrinsic viscosity as measured in a 1% solution of ethanol of 1.25 and a Brookfield viscosity of 26,000 cps.

EXAMPLE 2

Example 1 is repeated except that the dimethylaminoethyl methacrylate is replaced with substantially equivalent amounts of the following monomers:
dimethylaminomethyl acrylate
dimethylaminobutyl acrylate
diethylaminooctyl acrylate
diethylaminolauryl methacrylate
diethylaminostearyl methacrylate When the polymerization is conducted in the same manner as in Example 1, a substantially equivalent copolymer is produced.

EXAMPLE 3

Example 1 is repeated except that the comonomers are employed in the following amounts:

a. 800 parts of vinyl pyrrolidone — 100 parts dimethylaminoethyl methacrylate
b. 800 parts vinyl pyrrolidone — 300 parts dimethylaminoethyl acrylate
c. 800 parts vinyl pyrrolidone — 500 parts dimethylaminoethyl acrylate
d. 800 parts vinyl pyrrolidone — 600 parts dimethylaminoethyl acrylate.

When polymerization is carried out as in Example 1, substantially equivalent copolymers are produced, the ratio of the monomers dictating the ratio of the monomeric residuum in the copolymer product.

EXAMPLE 4

Example 1 is repeated except that in addition to the dimethylaminoethyl methacrylate and vinyl pyrrolidone the following copolymerizable vinyl monomers were also utilized:

a. methyl vinyl ether — 100 parts
b. octyl vinyl ether — 200 parts
c. methacrylic acid — 150 parts
d. methyl methacrylate — 300 parts e. styrene — 200 parts
f. vinyl acetate — 100 parts
g. vinylidene chloride — 100 parts — vinyl chloride — 100 parts
h. methacrylonitrile — 300 parts The terpolymers produced by following the polymerization technique of Example 1 all exhibited molecular weights within the range of 15,000 to 1,000,000. Each of such terpolymers is found to be eminently useful as a hair spray resin in that the same form clear, flexible, and easily removable films from both alcoholic solutions and aqueous systems.

EXAMPLE 5

Example 1 is repeated except that the following quaternizing agents are employed in lieu of diethyl sulfate:
a. dimethyl sulfate
b. ethyl sulfonic acid
c. benzyl chloride
d. benzyl bromide
e. benzyl iodide Again, each of the copolymers produced by the procedure of Example 1 was found to be eminently useful as a hair spray resin.

EXAMPLE 6

Into a 5 liter resin flask equipped with an agitator, gas inlet tube, thermometer, condenser and dropping funnel were charged 2700 grams distilled water, 720 grams of vinyl pyrrolidone and 180 grams of dimethylaminoethyl methacrylate. Agitation was commenced and 3.6 grams of tertiary butyl peroxypivalate were added. The reaction vessel was carefully purged with nitrogen and a nitrogen blanket was maintained therein throughout the reaction. The reaction mixture was then heated to about 70°C. Once polymerization commenced, occational cooling was necessary to maintain the temperature below about 75°C. The residual monomer level was reduced to below 0.5% by adding an additional increment of initiator (3.6 grams). The polymer solution was then cooled to below 30°C. 900 grams of distilled water were added to the extremely viscous solution to enable adequate agitation to be maintained. 84.5 grams of diethyl sulfate were added and the mixture was agitated for about 1 hour.

An analysis of the product obtained indicated a solids content of 21.87%. The polymer exhibited a relative viscosity measured in a 0.1% solution in water of 2.96 and a Brookfield viscosity measured as a 10% solution in water using a number four spindle at 30 rpm of 7700 cps.

EXAMPLE 7

To a 1 liter reaction flask equipped with an agitator, gas inlet tube, thermometer and condenser were charged 245 grams of distilled water, 48 grams of vinyl pyrrolidone and 54 grams of a 40% aqueous solution of dimethyl sulfate quaternized dimethylaminoethyl methacrylate (on a 1:1 molar basis) and 0.1 milliliters of tert-butylperoxypivalate. The quaternized dimethylaminoethyl methacrylate was pre-treated with 5 grams of activated carbon and filtered prior to use. The flask was then carefully purged with nitrogen and the reaction medium was heated to 70°–73°C. After 2 hours at this temperature, the material was cooled to 53°C. and 0.1 milliliters of tert-butyl peroxypivalate were added.

The reaction medium was then heated back to 70°–73°C. and held at that temperature for about 6 hours.

An analysis of the product indicated 19.8 percent solids. The pH of the product was 3.8. The relative viscosity of the polymer as measured in a 1% solution in water was 18.78 and the relative viscosity as measured in a 0.1% solution in water was 4.44. The Brookfield viscosity (as is) was 5,000 cps.

What is claimed is:

1. A high molecular weight, film-forming quaternary ammonium polymer represented by the following formula:

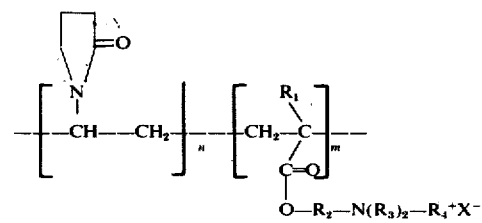

wherein n ranges from about 20 to about 95 mole percent and m ranges from about 5 to about 80 mole percent; $R_1$ is selected from the group consisting of H and $CH_3$; $R_2$ is alkylene containing from about 2 to 20 carbon atoms; the $R_3$'s are independently lower alkyl; $R_4$ is selected from the group consisting of alkyl of from 1 to about 8 carbon atoms and benzyl; and X is a member selected from the group consisting of halogen, $SO_4$, $HSO_4$, and alkyl sulfonic.

2. A high molecular weight, film-forming quaternary ammonium polymer represented by the following formula:

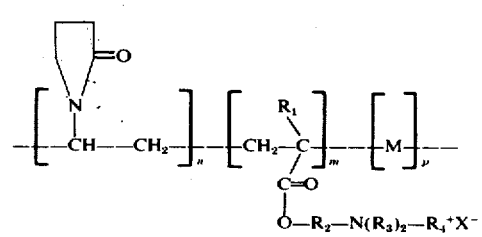

wherein $n$ ranges from about 20 to about 95 mole percent, $m$ ranges from about 5 to about 80 mole percent, $p$ ranges from 0 to about 50 mole percent, and $n + m + p = 100$; $R_1$ is selected from the group consisting of H and $CH_3$; $R_2$ is alkylene containing from about 2 to 20 carbon atoms; the $R_3$'s are independently lower alkyl; $R_4$ is selected from the group consisting of alkyl of from 1 to about 8 carbon atoms and benzyl; X is a member selected from the group consisting of halogen, $SO_4$, $HSO_4$, and alkyl sulfonic; and M is the residuum of a further copolymerizable vinyl monomer, said vinyl monomer being a member selected from the group consisting of alkyl vinyl ethers, acrylic and methacrylic acids and esters thereof, vinyl aromatic compounds, vinyl acetate, vinylidene chloride, vinyl chloride, acrylonitrile and derivatives thereof, methacrylonitrile derivatives thereof, acrylamide and methacrylamide and N-substituted derivatives thereof, and crotonic acid and esters thereof.

3. A high molecular weight, film-forming quaternary ammonium polymer as defined in claim 2 comprising on a molar basis:
i. 40 – 90 mole % of vinyl pyrrolidone;

ii. 5 – 40 mole % of a di-lower alkylaminoalkyl acrylate or methacrylate; and
iii. 0 – 50 mole % of monomer M.

4. A quaternary ammonium polymer as defined in claim 3 wherein component (ii) is dimethylaminoethyl methacrylate.

5. A quaternary ammonium polymer as defined in claim 3 consisting essentially of vinyl pyrrolidone and dimethylaminoethyl methacrylate.

* * * * *